(12) United States Patent
Wilson

(10) Patent No.: US 9,068,310 B2
(45) Date of Patent: Jun. 30, 2015

(54) SEDIMENT RETENTION BAG

(76) Inventor: Kenneth Wilson, Naples, FL (US)

( * ) Notice: Subject to any disclaimer, the term of this patent is extended or adjusted under 35 U.S.C. 154(b) by 806 days.

(21) Appl. No.: 13/317,683

(22) Filed: Oct. 25, 2011

(65) Prior Publication Data

US 2013/0098817 A1    Apr. 25, 2013

(51) Int. Cl.
*E02B 3/02* (2006.01)
*C02F 1/52* (2006.01)
*C02F 1/28* (2006.01)
*C02F 1/56* (2006.01)
*C02F 1/00* (2006.01)

(52) U.S. Cl.
CPC . *E02B 3/023* (2013.01); *C02F 1/52* (2013.01); *C02F 1/286* (2013.01); *C02F 1/5263* (2013.01); *C02F 1/56* (2013.01); *C02F 2001/007* (2013.01)

(58) Field of Classification Search
CPC ............ C02F 1/52; C02F 1/63; C02F 1/5272; C02F 1/5281; C02F 1/285; C02F 1/286; C02F 1/56; C02F 9/005; C02F 2001/007; C02F 2103/001; C02F 1/5263; C02F 2301/028; E03B 3/02; E03B 3/023; E02B 3/02; E02B 3/023; B01D 21/02; B01D 21/08; B01D 23/20; B01D 37/03; B01D 2221/12
See application file for complete search history.

(56) References Cited

U.S. PATENT DOCUMENTS

| | | | |
|---|---|---|---|
| 5,405,217 A | 4/1995 | Dias et al. | |
| 6,875,350 B2 * | 4/2005 | Allard | 210/209 |
| 7,441,665 B2 | 10/2008 | Bridges et al. | |
| 8,100,609 B2 | 1/2012 | Wilson | |
| 2003/0141233 A1 * | 7/2003 | Allard | 210/198.1 |
| 2006/0133897 A1 | 6/2006 | Allard et al. | |
| 2007/0003369 A1 | 1/2007 | Hanson et al. | |
| 2007/0193129 A1 | 8/2007 | Mansfield | |
| 2008/0019780 A1 | 1/2008 | Hastings | |
| 2008/0023408 A1 | 1/2008 | Hansen | |

OTHER PUBLICATIONS

Keith Pilgrim; "Chitosan Gel-Floc™"; New Stormwater Treatment Technology Information, Jul. 2006; Ramsey-Washington Metro Watershed District; www.rwmwd.org/.../New_Tech_July_2006-Chitosan_Gel-Floc.pdf.

* cited by examiner

*Primary Examiner* — Lucas Stelling
(74) *Attorney, Agent, or Firm* — Pauley Petersen & Erickson

(57) ABSTRACT

A sediment retention device including a water-permeable outer containment structure, a water-impermeable injection tube including an outlet disposed within the outer containment structure, and a flocculent treatment material disposed within the injection tube. The injection tube can include an agitation structure to promote mixing contaminated water with the treatment material. A baffle including water distribution openings can be disposed over the outlet to distribute water into the outer containment structure.

19 Claims, 1 Drawing Sheet

SEDIMENT RETENTION BAG

FIELD OF THE INVENTION

This invention relates to sediment control. More particularly, this invention relates to a sediment retention device for removing sediment from pumped or otherwise flowing water at, for example, a construction site.

BACKGROUND OF THE INVENTION

Environmental concerns and federal regulations, such as the Clean Water Act and the accompanying National Pollution Discharge Elimination System (NPDES) Program, require construction sites, including road work and dredging projects, to control water flow to stop sediment flow into waterways. With tightening turbidity standards, such as is measured in nephelometric turbidity units (NTU), for water discharge, there is a continuing need for lowering the NTU of pumped or otherwise discharged water.

SUMMARY OF THE INVENTION

A general object of the invention is to lower turbidity in contaminated water, such as water pumped from a construction site.

The invention is attained, at least in part, through a sediment retention device. The sediment retention device includes an injection tube having an inlet at a first end and an outlet at an opposing second end, and a treatment material disposed within the injection tube. A water-permeable outer containment structure surrounds at least a portion of the injection tube, wherein a liquid flowing from the outlet enters the outer containment structure.

The invention further comprehends a sediment retention device including a water-permeable outer containment structure and a water-impermeable injection tube including an outlet disposed within the outer containment structure. A baffle is disposed over the outlet and includes water distribution openings. A flocculent treatment material is disposed within the injection tube.

The invention still further includes a sediment retention device including a water-permeable outer containment structure enclosing a containment chamber. The device further includes a water-impermeable injection tube including an inlet for connection to a hose, and an outlet disposed within the outer containment structure. The injection tube includes a first section extending from the inlet, a second section extending parallel and adjacent the first section, and a third section extending parallel and at least partially adjacent to the second section. A baffle is disposed around a portion of the injection tube that includes the outlet. The baffle includes water distribution openings connecting a baffle chamber to the containment chamber. A first treatment material is in a first pouch within the injection tube, and a second treatment material is in a second pouch also within the injection tube.

The present invention provides a device for removing sediment and other suspended contaminants from water. The apparatus can be embodied as a sediment retention bag preloaded with a biopolymer or other flocculant water treatment material or system. Contaminated water is pumped from an area through a hose connected to an injection port of the sediment retention bag. The water flows through an internal baffle system, where the water encounters a treatment agent and is agitated. The treated water is forced through a geofilter envelope while the sediment is contained within the sediment retention bag.

Other objects and advantages will be apparent to those skilled in the art from the following detailed description taken in conjunction with the appended claims and drawings.

DESCRIPTION OF THE INVENTION

Figure 1:
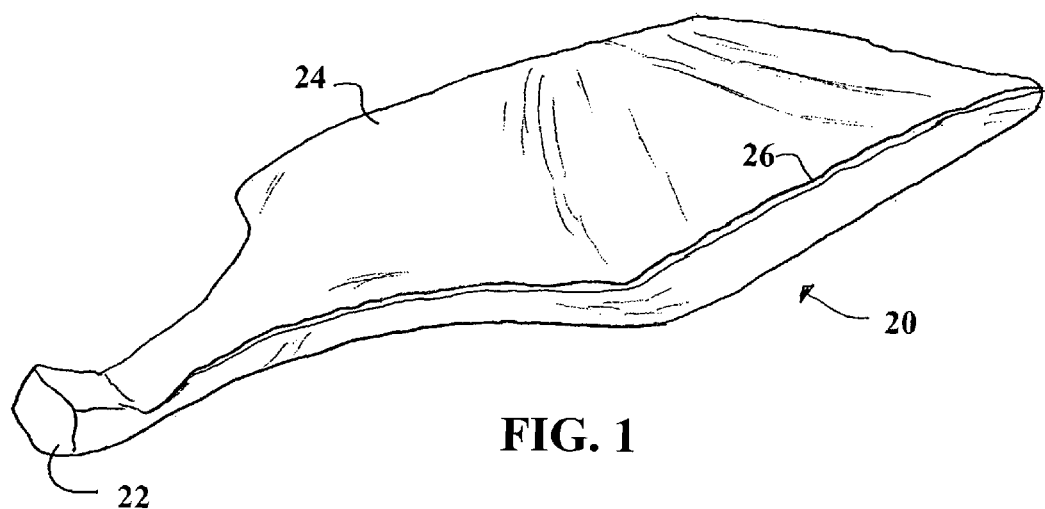
FIG. 1 is a perspective view of a sediment retention device according to one embodiment of this invention.

The present invention provides a device for removing sediment from water. FIG. 1 illustrates a sediment retention device according to one embodiment of this invention, embodied as sediment retention bag 20. The sediment retention bag has an inlet 22 that leads into an internal injection tube (not shown). The inlet 22 can include any necessary hose connect for attaching a hose from a pump. The sediment retention bag 20 includes an outer containment structure 24, illustrated as a fabric bag, enclosing a chamber that includes the internal injection tube. Contaminated water enters the inlet 22, travels through treatment in the internal injection tube. Contaminants, such as sediment, desirably fall out of suspension upon treatment and remain in the chamber while the water exits through the outer containment structure 24.

Various materials are available for the construction of the sediment retention bag of this invention. The outer containment structure can be water-permeable, or include any suitable water-passing structure. In one embodiment of this invention the outer containment structure 24 is formed of a water-permeable woven or nonwoven material, such as a geotextile material known for use in sediment bags and barriers. One exemplary geotextile material is a needle-punched polypropylene nonwoven material sold under the name GEO-FORCE NW8, available from Midwest Construction Products (Fox River Grove, Ill.) and having a water flow rating of about 90 $gpm/ft^2$ (ASTM-D4491). The outer containment structure 24 is generally formed from more than one fabric pieces connected at a seam 26. The seam 26 can be formed by stitching or other suitable connection methods, such as gluing or stapling.

Various sizes, shapes, and configurations are also available for the sediment retention device of this invention. The outer containment structure 24 is shown as a generally rectangular shape, but can be circular or another shape depending on need. In one embodiment of this invention, the sediment retention bag 20 has a length of about 15 feet and a width of about 7-8 feet, but can be modified according to need.

Figure 2:
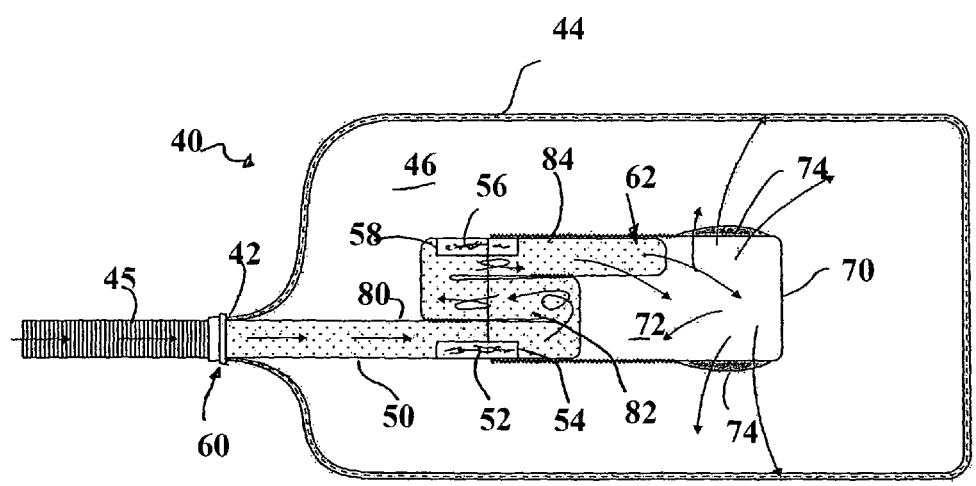
FIG. 2 is a sectional view of a sediment retention device according to one embodiment of this invention.

FIG. 2 is a sectional view of a sediment retention bag 40 according to one embodiment of this invention. The bag 40 includes an outer containment structure 44 enclosing a chamber 46. The bag 40 is connected at an inlet 42 to a first end 60 of an injection tube 50. The injection tube first end 60 is adapted to connect to hose 45, which is connected at an opposing end to a pump (not shown). Contaminated water is pumped through hose 45 into the injection tube 50. Various sizes, shapes, and materials are available for the injection tube 50. In the embodiment of FIG. 2, the injection tube 50 is a high strength plastic or metal water impervious tube.

The bag 40 includes a treatment material 52 disposed within the injection tube 50. The treatment material 52 is disposed within a water-permeable pouch 54 or other similar material treatment container. As the water passes the pouch 54, the treatment material 52 is released into the water. The treatment material can be any suitable material for treating or removing the contaminant from the water. In one embodiment of this invention, the treatment material includes a biopolymer, or other flocculant, for removing, for example, suspended solids, hydrocarbons, heavy metals, oils, and/or organic compounds from water. Exemplary flocculants and/or biopolymers include, without limitation chitosan and/or polyacrylamide materials. Particular flocculants useful in the device of this invention include flocculants and/or biopolymers available from HaloSource, Inc, and sold under the trade names HALOKLEAR and GELFLOC or DBP.

In one embodiment of this invention, as shown in FIG. 2, the injection tube includes a first flocculent 52 in a first pouch 54 and a second flocculent 56 in a second pouch 58. Two or more pouches can be useful for two-part or "dual polymer" treatment material systems including two of the same or different treatment materials. For example, the treatment material may be effective upon combination of the first flocculent 52 and the second flocculant 56. The first flocculant 52 is introduced into the water upon contact with the first pouch 54, and the first flocculant 52 is activated upon the treated water reaching the second pouch 58. Alternatively, the two different flocculants can have a synergistic affect. In one embodiment of this invention, the first flocculent 52 can include a HALOKLEAR GELFLOC chitosan flocculant in pouch 54 and the second flocculent 56 can include HALOKLEAR DBP-2100 biopolymer flocculant (also from HaloSource, Inc.) in pouch 58.

The injection tube 50 provides an agitation structure to agitate the contaminated water. In one embodiment of this invention, as shown in FIG. 2, the agitation structure includes two 180 degree bends in the tube 50 between the inlet 60 and an outlet 62 at the opposing end. As illustrated by arrows the change of direction causes the pumped water to swirl or otherwise agitate. The agitation can be particularly beneficial to mix and distribute the first flocculant 52 within the water flow. Upon further agitation at the second bend and then encountering the second flocculant 56, the water exits the injection tube through outlet 62. In FIG. 2, the first pouch 54 is attached in a first section 80 of the injection tube, and the second pouch 58 is attached in a third section 84. However, either the first pouch 54 or the second pouch 58 could alternatively be attached in the second section 82. Furthermore, alternative or additional agitation structures could be used, for example, a straight or curved tube can include fins or other internal projections to agitate the water.

In one embodiment of this invention, as shown in FIG. 2, the bag 40 includes a baffle 70 in combination within the outlet 62 and within the containment chamber 46. The baffle 70 extends around, and is attached, a portion of the injection tube 50 that includes the outlet 62. The baffle 70 is desirably formed of a nonwoven geotextile material, which can be the same or different from the outer containment structure 44. The baffle 70 includes a baffle chamber 72 and openings 74 connecting the baffle chamber 72 with the containment chamber 46. Treated water exiting the outlet 62 enters the baffle chamber 72. The baffle 70 is an optional addition useful to assist in distributing the treated water in the containment chamber 46. Various and alternative structures are available for or as a substitute for the baffle. For example, the outlet end of the injection tube 50 can itself be formed as a distributing baffle structure, such as including a widened portion and/or a plurality of directional openings.

The treated water enters the water-permeable outer containment structure of outer containment structure 44. The contaminant desirably falls out of suspension and is contained in the chamber 46. The treated water flows out through the water-permeable material and into the surrounding environment.

A sediment retention bag as shown in FIG. 1, and having internal structure according to FIG. 2 was used and tested in Bonita Springs, Fla. The sediment retention bag had dimensions of 7.5 feet wide by 15 feet long, and an outer containment structure formed of GEOFORCE NW8 fabric with a trap tear of 85 lbs (ASTM-D4533), a puncture of 130 lbs (ASTM-D4833), a water flow of 90 gpm/ft$^2$, an AOS of 80 sieve (ASTM-D4751), and triple stitched at seams. The polyester coated non-permeable injection tube included a first pre-sewn pouch of 300 grams GELFLOC and a second pre-sewn pouch of 300 grams DBP-2100. Contaminated water was pumped from the construction site with a standard dewatering pump at a rate of 800 to 100 gpm. Water exiting the outer containment structure was collected and measured. Water at the intake of the bag measured 162 NTU at a first test and 187 NTU at a second test after 10 minutes. After 2 minutes of running, water exiting the bag measured 43 NTU, after 10 minutes of running the water measured 9 NTU, after 20 minutes of running, the water measured 3.2 NTU.

Thus, the invention provides a sediment retention device that is easily attachable to a hose opposite a pump for receiving contaminated water. A treatment material acts to remove suspended sediment and other contaminants from the water flowing within the device. The water-permeable material of the device allows the clearer, treated water to exit the device while the contaminants are retained within the device.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A sediment retention device, comprising:
a water-impermeable injection tube having an inlet at a first end and an outlet at an opposing second end;
a treatment material disposed within the injection tube;
a water-permeable outer containment structure including a containment chamber and a structure inlet connected around the injection tube proximate to the first end, the water-permeable outer containment structure surrounding at least a portion of the injection tube and enclosing the at least a portion of the injection tube within the containment chamber, wherein a liquid flowing from the outlet enters the outer containment structure, and
a baffle disposed within the containment chamber in combination with and over the outlet of the injection tube, the baffle defining a baffle chamber around the outlet of the injection tube and the baffle including openings connecting the baffle chamber with the containment chamber.

2. The device according to claim 1, wherein the injection tube comprises an agitation structure, wherein the agitation structure of the injection tube is disposed within the chamber.

3. The device according to claim 2, wherein the agitation structure comprises at least one bend in the injection tube.

4. The device according to claim 1, wherein the treatment material is contained in at least one pouch within the injection tube.

5. The device according to claim 1, wherein the treatment material comprises chitosan.

6. The device according to claim 1, wherein the treatment material comprises a first flocculent in a first pouch and a second flocculent in a second pouch, each of the first pouch and the second pouch disposed within the injection tube.

7. The device according to claim 1, wherein outer containment structure comprises a nonwoven geotextile material, and the injection tube is formed of plastic or metal.

8. The device according to claim 1, wherein the baffle comprises a nonwoven geotextile material.

9. A sediment retention device, comprising:
   a water-permeable outer containment structure enclosing a containment chamber;
   a water-impermeable injection tube including an outlet disposed within the containment chamber;
   a baffle disposed within the containment chamber and over the outlet, the baffle including a baffle chamber and water distribution openings, wherein water flows from the outlet into the baffle chamber, and from the baffle chamber into the containment chamber through the water distribution openings; and
   a flocculent treatment material disposed within the injection tube.

10. The device according to claim 9, further comprising a hose connection at an inlet of the injection tube, wherein the containment structure comprises a containment structure inlet attached around the injection tube at or near the hose connection.

11. The device according to claim 9, wherein the injection tube comprises more than one bend.

12. The device according to claim 11, further comprising two 180 degree bends.

13. The device according to claim 9, wherein the treatment material is contained in at least one pouch within the injection tube.

14. The device according to claim 9, wherein the treatment material comprises chitosan.

15. The device according to claim 9, wherein the treatment material comprises a first flocculent in a first pouch and a second flocculent in a second pouch, each of the first pouch and the second pouch disposed within the injection tube.

16. The device according to claim 1, wherein each of the outer containment structure and the baffle comprises a nonwoven geotextile material.

17. A sediment retention device, comprising:
   a water-permeable outer containment structure enclosing a containment chamber and including a chamber inlet;
   a water-impermeable injection tube including an inlet and an outlet, wherein the chamber inlet is connected around the injection tube and the outlet is disposed within the containment chamber, the injection tube including a first section extending from the inlet, a second section extending parallel and adjacent the first section, and a third section extending parallel and at least partially adjacent to the second section, wherein the first section, second section, and third section are each connected by bends in the injection tube and disposed within the containment chamber;
   a baffle disposed around a portion of the injection tube including the outlet, the baffle including water distribution openings connecting a baffle chamber to the containment chamber, wherein water from the outlet passes through the baffle chamber and the water distribution openings to enter the containment chamber; and
   a first treatment material in a first pouch within the injection tube; and
   a second treatment material in a second pouch within the injection tube.

18. The device according to claim 17, wherein the first pouch is disposed within the first section and the second pouch is disposed within the second section or the third section.

19. The device according to claim 17, wherein at least one of the first treatment material or the second treatment material comprises chitosan.

* * * * *